(12) United States Patent
Peterson (10) Patent No.: US 6,719,429 B2
(45) Date of Patent: Apr. 13, 2004

(54) ANAMORPHIC ILLUMINATION OF MICRO-ELECTROMECHANICAL DISPLAY DEVICES EMPLOYED IN MULTIMEDIA PROJECTORS

(75) Inventor: Mark Peterson, Lake Oswego, OR (US)

(73) Assignee: InFocus Corporation, Wilsonville, OR (US)

(*) Notice: Subject to any disclaimer, the term of this patent is extended or adjusted under 35 U.S.C. 154(b) by 317 days.

(21) Appl. No.: 09/823,389

(22) Filed: Mar. 30, 2001

(65) Prior Publication Data

US 2002/0140911 A1 Oct. 3, 2002

(51) Int. Cl.[7] ............... G03B 21/00; G03B 21/26; G03B 21/14; G03B 21/28; G02B 5/32
(52) U.S. Cl. ............... 353/69; 353/31; 353/34; 353/37; 353/38; 353/50; 353/94; 353/98; 359/20; 349/62; 348/742; 348/771
(58) Field of Search ............... 353/69, 31, 34, 353/37–38, 50, 94, 98; 359/20; 349/62, 68; 348/742–743, 771

(56) References Cited

U.S. PATENT DOCUMENTS

| 5,151,718 A | 9/1992 | Nelson | 346/160 |
|---|---|---|---|
| 5,159,485 A | 10/1992 | Nelson | 359/291 |
| 5,303,084 A | 4/1994 | Pflibsen et al. | 359/503 |
| 5,379,081 A * | 1/1995 | Kim et al. | 353/99 |
| 5,555,041 A * | 9/1996 | Manabe | 353/98 |
| 5,592,188 A * | 1/1997 | Doherty et al. | 345/84 |
| 5,754,278 A * | 5/1998 | Kurtz | 355/67 |
| 5,844,588 A | 12/1998 | Anderson | 347/135 |
| 6,129,437 A * | 10/2000 | Koga et al. | 353/98 |
| 6,260,974 B1 * | 7/2001 | Koyama | 353/98 |
| 6,419,365 B1 * | 7/2002 | Potekev et al. | 353/98 |
| 6,517,210 B2 * | 2/2003 | Peterson et al. | 353/98 |
| 6,523,961 B2 * | 2/2003 | Ilkov et al. | 353/99 |
| 6,652,105 B1 * | 11/2003 | Peterson et al. | 353/98 |

* cited by examiner

Primary Examiner—Russell Adams
Assistant Examiner—Magda Cruz
(74) Attorney, Agent, or Firm—Schwabe, Williamson & Wyatt, P.C.

(57) ABSTRACT

Micro-electromechanical display device ("MDD")-based multimedia projectors (90, 120) of this invention employ an arc lamp (32), a color modulator (42), and anamorphic illumination systems (94, 121) for optimally illuminating a MDD (50, 76) to improve projected image brightness. MDDs employ off-axis illumination wherein incident and reflected light bundles are angularly separated about a hinge axis (78, 110) and the MDD is illuminated by the anamorphic illumination systems of this invention having a slow f/# parallel to the hinge axis and a faster f/# perpendicular to the hinge axis. The resulting anamorphic light bundles (86, 88, 112, 114) illuminate and reflect more light into and off the MDD and through a fast f/# projection lens.

20 Claims, 6 Drawing Sheets

ANAMORPHIC ILLUMINATION OF MICRO-ELECTROMECHANICAL DISPLAY DEVICES EMPLOYED IN MULTIMEDIA PROJECTORS

RELATED APPLICATION(S)

Not Applicable

FEDERALLY SPONSORED RESEARCH OR DEVELOPMENT

Not Applicable

TECHNICAL FIELD

This invention relates to video and multimedia projectors and more particularly to improving the projected brightness of such projectors by employing anamorphic illumination of micro-electromechanical display devices employed therein.

BACKGROUND OF THE INVENTION

Projection systems have been used for many years to project motion pictures and still photographs onto screens for viewing. More recently, presentations using multimedia projection systems have become popular for conducting sales demonstrations, business meetings, and classroom instruction. Such multimedia projection systems typically receive from a personal computer ("PC") analog video signals representing still, partial-, or full-motion display images that are converted into digital video signals for controlling a digitally driven image-forming device, such as a micro-electromechanical display device ("MDD"), a common type of which is a digital micromirror device. An example of a popular MDD-based multimedia projector is the model LP420 manufactured by In Focus Corporation, Wilsonville, Ore., the assignee of this application.

Significant effort has been invested into developing multimedia projectors producing bright, high-quality, color images. However, the optical performance of conventional projectors is often less than satisfactory. For example, suitable projected images having adequate brightness are difficult to achieve, especially when using compact portable color projectors in a well-lighted room.

Figure 1:
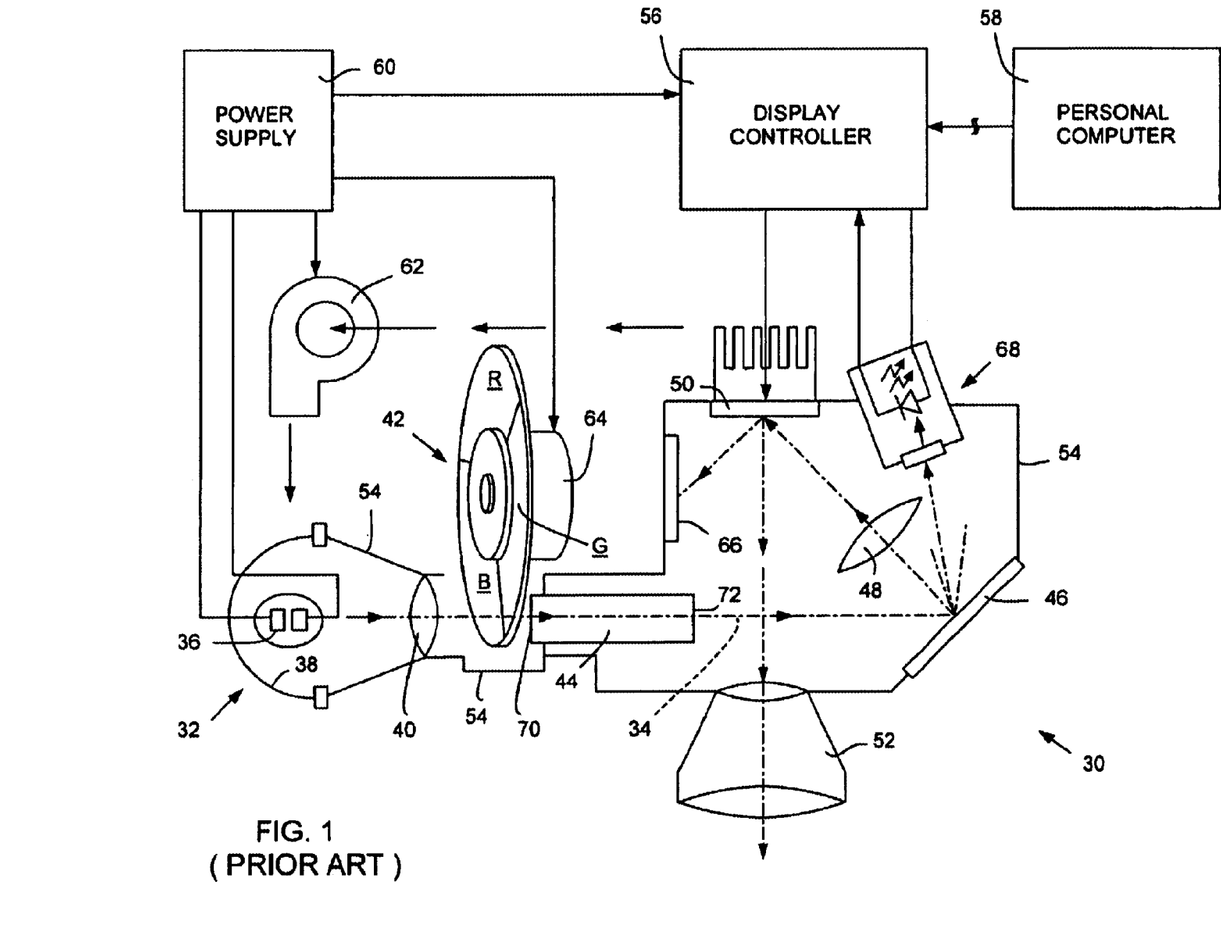
FIG. 1 is a simplified pictorial and electrical block diagram of a prior art multimedia projector showing a light path employing a color wheel, a light integrating tunnel, a MDD, and a projection lens.

FIG. 1, shows a typical prior art multimedia projector 30 including a light source 32 that propagates polychromatic light along an optical path 34. Light source 32 generates intense light by employing an arc lamp 36 and an elliptical reflector 38. Optical path 34 includes a condenser lens 40, a color wheel 42, a light integrating tunnel 44, a fold mirror 46, a relay lens 48, an MDD 50, and a projection lens 52. One or two field lenses (not shown) typically follow light integrating tunnel 72. The optical components are held together by an optical frame 54 that is enclosed within a projector housing (not shown). A display controller 56 receives color image data from a PC 58 and processes the image data into frame sequential red, green, and blue image data, sequential frames of which are conveyed to MDD 50 in proper synchronism with the rotating angular position of color wheel 42. A power supply 60 is electrically connected to light source 32 and display controller 56 and also powers a cooling fan 62 and a free running DC motor 64 that rotates color wheel 42. Display controller 56 controls MDD 50 such that light propagating from relay lens 48 is selectively reflected by MDD pixel mirrors either toward projection lens 52 or toward a light-absorbing surface 66 mounted on or near optical frame 54. Color wheel synchronization is achieved by an appropriate sensor coupled to color wheel 42 or by employing a color selective light sensor 68 to detect the time period during which a predetermined color filter segment is in optical path 34.

To increase projected image brightness and uniformity, an input aperture 70 of light integrating tunnel 44 collects light exiting color wheel 42 and homogenizes the light during propagation through tunnel 44 to an output aperture 72. The uniformly bright rectangular light bundle exiting output aperture 72 propagates through the field lenses, reflects off fold mirror 46, and is imaged by relay lens 48 onto MDD 50. Unfortunately, because of the oblique illumination angle of MDD 50, the bright image of output aperture 72 typically overfills at least a portion of MDD 50 resulting in reduced brightness of the projected image.

Brightness-reducing overfill of light valves, such as MDDs is a common problem that prior workers have toiled to solve. For example, U.S. Pat. No. 5,159,485 for SYSTEM AND METHOD FOR UNIFORMITY OF ILLUMINATION FOR TUNGSTEN LIGHT describes employing a tungsten lamp and an anamorphic optical system to illuminate an elongated, linear MDD array used for line-scanning a photo-sensitive drum in a printer. (Conventional anamorphic optical systems employ a lens or lenses having different focal lengths or magnification factors in perpendicular planes to the optical axis.) The anamorphic optical system receives a substantially rectangular light bundle from the tungsten lamp and squashes the light bundle in one axis so that the resulting squashed light bundle illuminates the elongated, linear MDD without substantial overfill. Unfortunately, employing a tungsten lamp without an integrator tunnel results in insufficient illumination uniformity and brightness for use in a multimedia projector.

What is needed, therefore, is an improved way of capturing as much of the light propagated through a color modulator as possible and uniformly imaging the light on a MDD without significant overfill.

SUMMARY OF THE INVENTION

An object of this invention is, therefore, to provide an apparatus and a method for improving the illumination brightness and uniformity of a MDD employed in a multimedia projector.

MDD-based multimedia projectors of this invention employ an arc lamp, a color modulator, and anamorphic illumination systems for optimally illuminating the MDD to improve projected image brightness. MDDs typically employ off-axis illumination wherein incident and reflected light bundles are angularly separated by an amount determined by the mirror tilt angle about a mirror hinge axis. Thus, in an MDD in which the mirrors have a ±10-degree tilt angle, the incident and reflected light bundles would be angularly separated about the hinge axis by 20-degrees. This angular separation limits the conical angles available for the incident and reflected light bundles and, therefore, limits the illumination f/# and defines a practical entrance pupil f/# for the projection lens (hereinafter "f/#" may also be referred to as "f/number"). In this invention, however, the MDD is illuminated by an anamorphic illumination source having a tilt angle limited f/# perpendicular to the MDD hinge axis and a faster f/# parallel to the MDD hinge axis. This causes the incident and reflected light bundles to have elliptical, rather than circular cross-sections, resulting in more total light illuminating and reflecting off the MDD. A projection lens having an enlarged entrance pupil (faster f/# lens) gathers and projects the reflected light bundle to produce a brighter projected image.

A first embodiment of the anamorphic illumination system is suitable for use with MDDs in which an array of micromirrors each pivot parallel to a hinge axis that is parallel to an edge margin of the MDD. Light rays exiting the color modulator enter an input aperture of an anamorphic integrator tunnel, propagate through the anamorphic integrator tunnel, and exit through an output aperture. The anamorphic light tunnel has orthogonal length, width, and height axes. The output aperture has a width to height ratio that matches a width to height ratio of the MDD, whereas the input aperture has the same height, but twice the width of the output aperture. The anamorphic integrator tunnel functions as a non-imaging light concentrator and emits the light rays from the output aperture with f/0.4 illumination angles in the width axis and f/1 illumination angles in the height axis. At least one field lens images the output aperture onto the MDD, which receives an anamorphic incident light bundle corresponding to the f/0.4 and f/1 illumination angles.

A second embodiment of the anamorphic illumination system is suitable for use with MDDs in which an array of micromirrors each pivot parallel to a hinge axis that extends diagonally across the MDD. In this embodiment the anamorphic optical system comprises a collimating lens system, first and second flyeye lenslet arrays, and an imaging lens system. The first flyeye lenslet array includes a 3-by-5 array of first lenslets having as aspect ratio substantially the same as the MDD aspect ratio. The projection along the optical axis of the centers of curvature of the first flyeye lenslets corresponds to the centers of the of the lenslets of the second flyeye lenslet array. The first lenslets have a slightly rhomboid, but not necessarily equalateral, shape to compensate for the oblique illumination angle on the MDD, and their centers are offset to steer the light rays toward corresponding lenslets in the second flyeye lenslet array. The second flyeye lenslet array includes a 3-by-5 array of second lenslets having centers of curvature that are centered in each lenslet for best light transmission efficiency. The first and second lenslet arrays are arranged into their respective arrays to form an anamorphic illumination ellipse having a major axis that is aligned with diagonal hinge axis of the MDD. The imaging lens system images the first flyeye lenslet array onto the MDD, thereby producing an anamorphic incident light bundle of this invention.

Additional objects and advantages of this invention will be apparent from the following detailed description of preferred embodiments thereof that proceed with reference to the accompanying drawings.

DETAILED DESCRIPTION OF PREFERRED EMBODIMENTS

Figure 2:
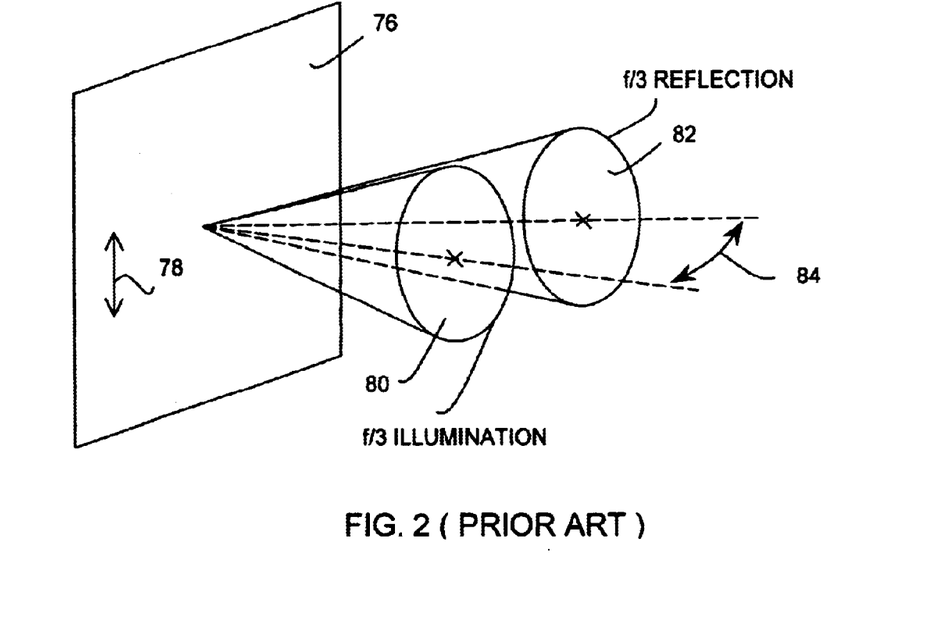
FIG. 2 is an isometric pictorial representation of a prior art reflective display device illumination technique.

FIG. 2 shows the illumination of an exemplary prior art reflective micromirror display device 76 in which the micromirrors pivot about a hinge axis 78 that is parallel to an edge margin of display device 76. This example is also applicable to other mirror hinge axis orientations as described later with reference to FIGS. 5, 6, and 7. Display device 76 receives a conventional conical incident light bundle 80 and reflects a conventional conical reflected light bundle 82, the centers of which are separated by an angle 84 corresponding to the mirror tilt angle range of display device 76. In this example, incident light bundle 80 and reflected light bundle 82 each have at an f/3 illumination number. Therefore, a projection lens having an f/3 entry pupil is the fastest practical lens usable in this example.

Figure 3:
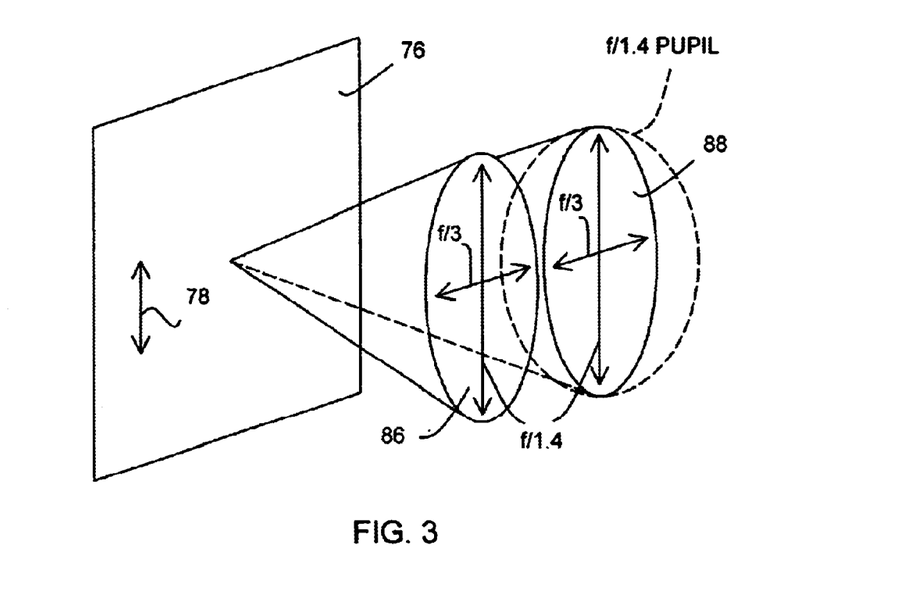
FIG. 3 is an isometric pictorial representation of a reflective display device anamorphic illumination technique of this invention.

In contrast, FIG. 3 shows reflective micromirror display device 76 employing anamorphic illumination in an embodiment of this invention. In this example, an incident light bundle 86 and a reflected light bundle 88 each have a first f/number of f/3 in the direction perpendicular to hinge axis 78. However, incident light bundle 86 and reflected light bundle 88 each have a substantially faster second f/number of f/1.4 in the direction parallel to hinge axis 78. Light bundles 86 and 88 are, therefore, anamorphic. In this example, a projection lens having an f/1.4 entry pupil (shown in dashed lines) is the fastest practical lens usable and would produce a brighter projected image than the f/3 projection lens described with reference to FIG. 2.

This invention increases the total illumination of display device 76 by increasing the illumination f/# in the direction parallel to hinge axis 78. The individual mirrors in display device 76 are isotropic, which circumvents any decreased reflectance performance that might otherwise result from the anamorphic f/# illumination of this invention.

Figure 4A:
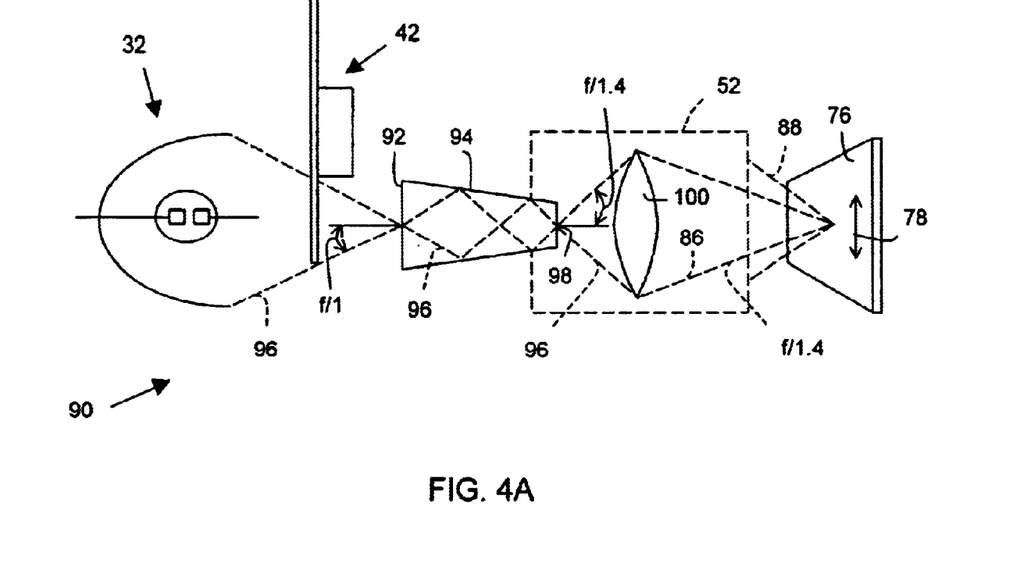
FIGS. 4A and 4B are respective top and side simplified pictorial views representing a first embodiment of a MDD-based projector optical system employing an anamorphic light tunnel of this invention.
Figure 4B:
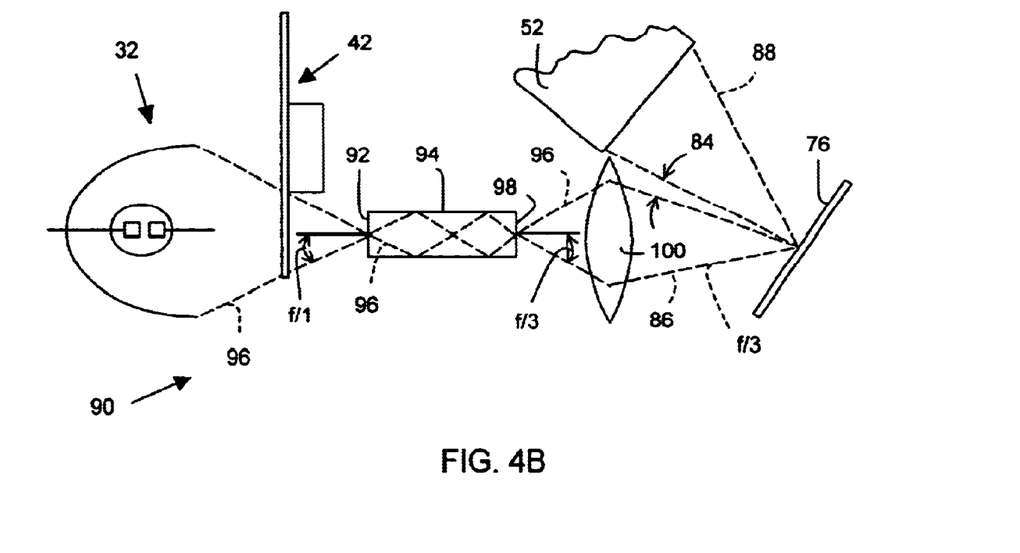

FIGS. 4A and 4B show respective top and side views of a first embodiment of this invention that is suitable for use in a multimedia projector 90, which is architecturally similar to prior art multimedia projector 30 of FIG. 1. However, projector 90 does not include fold mirror 46, and MDD 50 is replaced by display device 76, which has an array of micromirrors that each pivot parallel to hinge axis 78 to control pixels in on- and off-states. Hinge axis 78 is parallel to an edge margin of display device 76. Display controller 56 (FIG. 1) controls the states of the array of micromirrors (pixels) to selectively reflect a projected image through projection lens 52.

Multimedia projector 90 preferably includes conventional light source 32 for propagating intense illumination through a color modulator, such as color wheel 42. Light exiting the color modulator enters an input aperture 92 of an anamorphic integrator tunnel 94. Light rays 96 propagate by multiple reflection through anamorphic integrator tunnel 94 and exit through an output aperture 98. Anamorphic integrator tunnel 94 has orthogonal length, width, and height axes.

Output aperture 98 has a width to height ratio that matches a width to height ratio of the display device 76, whereas input aperture 92 has the same height, but twice the width of output aperture 98. Anamorphic integrator tunnel 94 functions as a non-imaging light concentrator and emits the light rays from the output aperture with f/0.4 illumination angles in the width axis and f/1 illumination angles in the height axis. At least one field lens 100 images output aperture 98 onto the display device 76, which receives an anamorphic incident light bundle 86 corresponding to the f/0.4 and f/1 illumination angles. Because display devices, such as display device 76, typically have a 4:3 aspect ratio, output aperture 96 preferably has a 4:3 aspect ratio and input aperture 92 preferably has an 8:3 aspect ratio.

As shown in FIGS. 4A and 4B, light source 32 presents an f/1 illumination pupil to input aperture 92. However, because input aperture 92 is stretched in one axis, anamorphic integrator tunnel functions as a non-imaging light concentrator and emits light rays 96 from output aperture 98 with f/0.4 illumination angles in one axis (FIG. 4A) and f/1 illumination angles in the perpendicular axis (FIG. 4B).

Field lens or lenses 100 forms incident light bundle 86 by imaging output aperture 98 onto display device 78. Lens or lenses 100 have an aperture that accepts the maximum f/0.4 illumination angle of light rays 96 exiting anamorphic integrator tunnel 94.

Display device 76 receives anamorphic incident light bundle 86 over first and second orthogonal ranges of incident light angles f/3 and f/1.4 corresponding respectively to the above-described f/1 and f/0.4 illumination angles. Display device 76 pixels in the pixel on-state reflect reflected light bundle 88 over first and second orthogonal ranges of reflected light angles corresponding respectively to the above-described f/3 and f/1.4 illumination numbers.

Projection lens 52 preferably has an f/1.4 pupil to receive the f/1.4 component of reflected light bundle 88 even though the f/3 component underfills the f/1.4 pupil.

Figure 5:
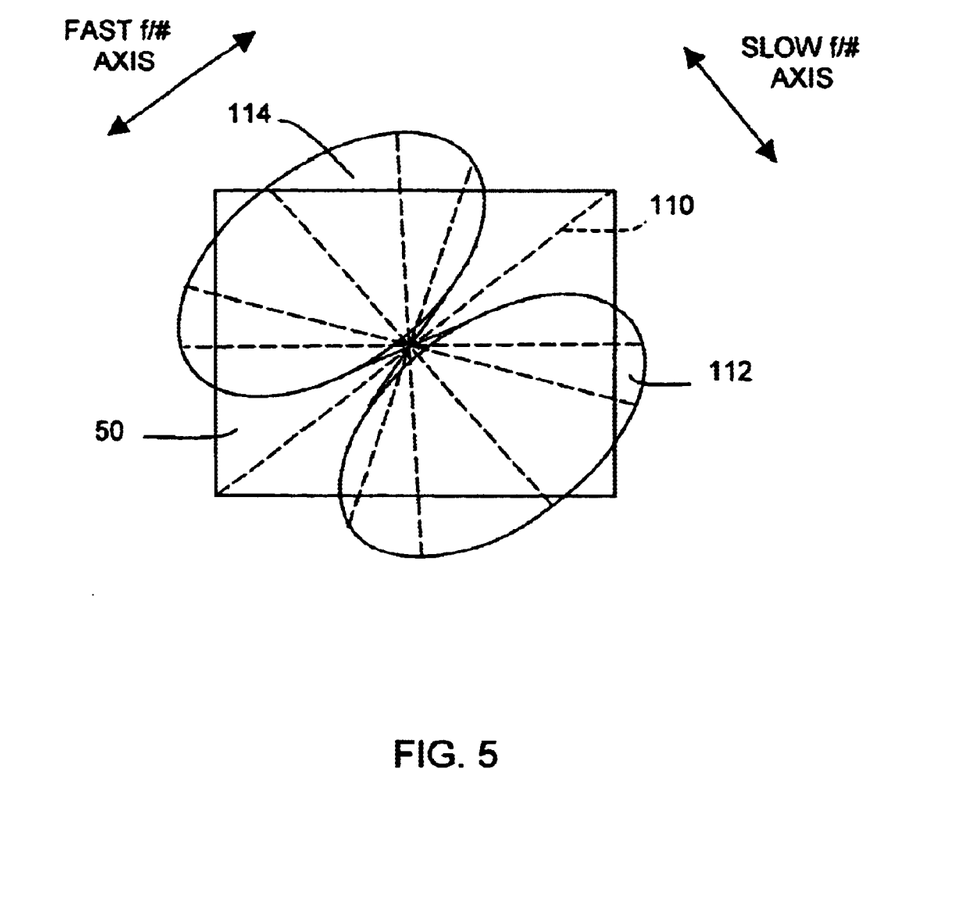
FIG. 5 is a frontal view representing anamorphic illumination of a diagonally hinged MDD.

Referring also to FIG. 5, display device 76 is somewhat idealized because typical reflective display devices, such as MDD 50 (FIG. 1) have micromirror arrays that pivot parallel to a diagonal hinge axis 110. As in multimedia projector 90, projected brightness can be increased by illuminating MDD 50 with an anamorphic incident light bundle 112 that is stretched parallel to diagonal hinge axis 110 (the fast f/# axis). A reflected light bundle 114 will then be similarly stretched parallel to diagonal hinge axis 110. The problem is how to increase the illumination diagonally while accounting for the aspect ratio, oblique illumination angles, and minimizing overfill of MDD 50.

Figure 6:
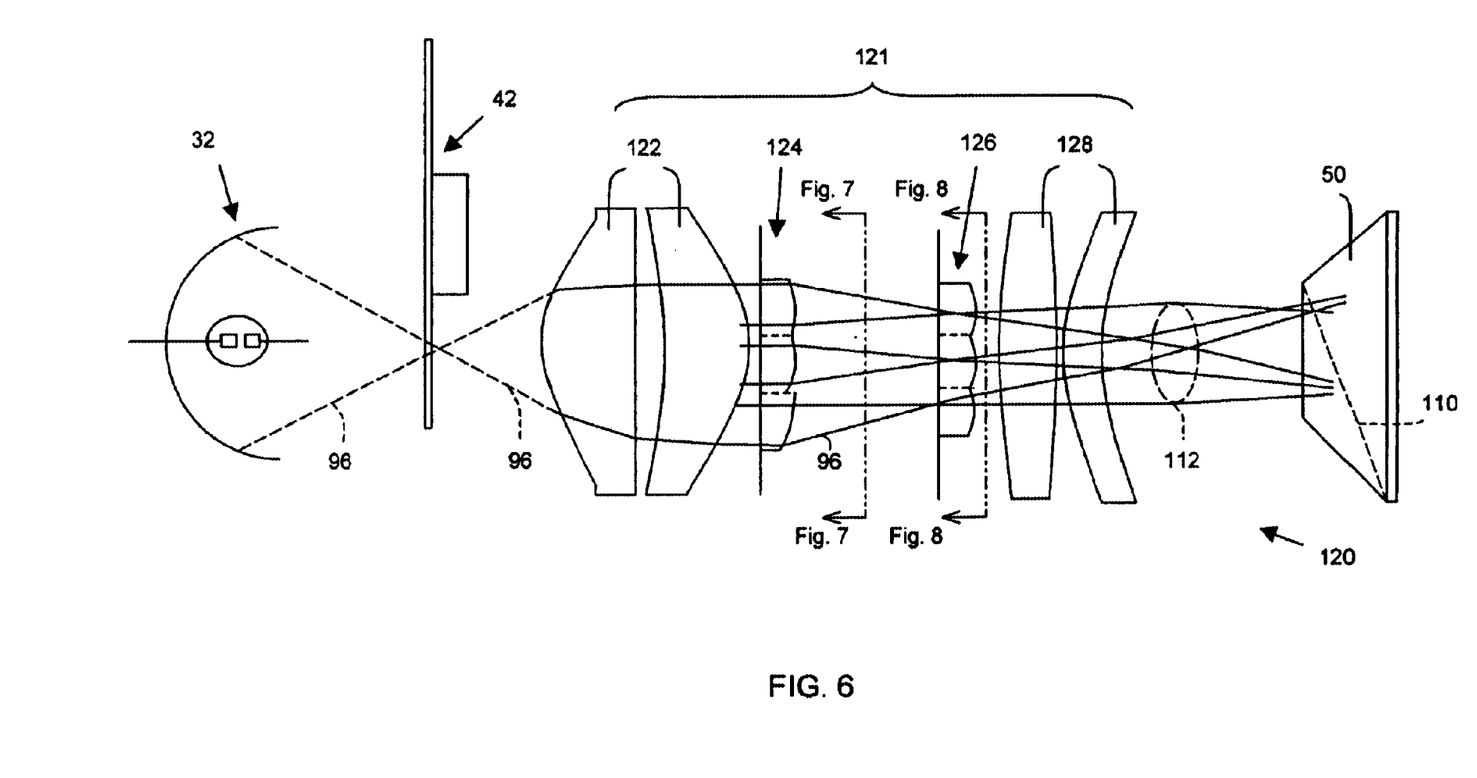
FIG. 6 is a simplified pictorial top view representing a second, preferred embodiment, of a MDD-based projector optical system employing anamorphic flyseye lenses of this invention.
Figure 7:
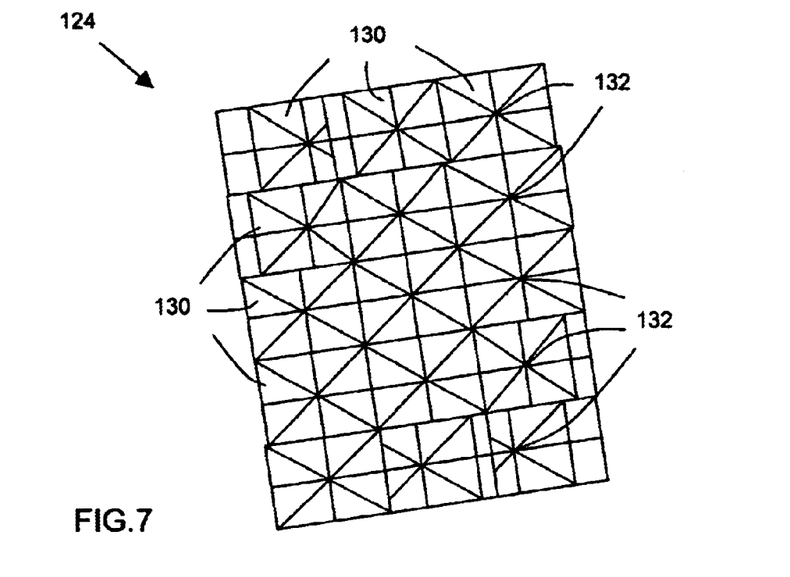
FIG. 7 is a frontal pictorial view taken along lines 7—7 of FIG. 6 showing a lenslet array layout of a first anamorphic flyseye lens of this invention.
Figure 8:
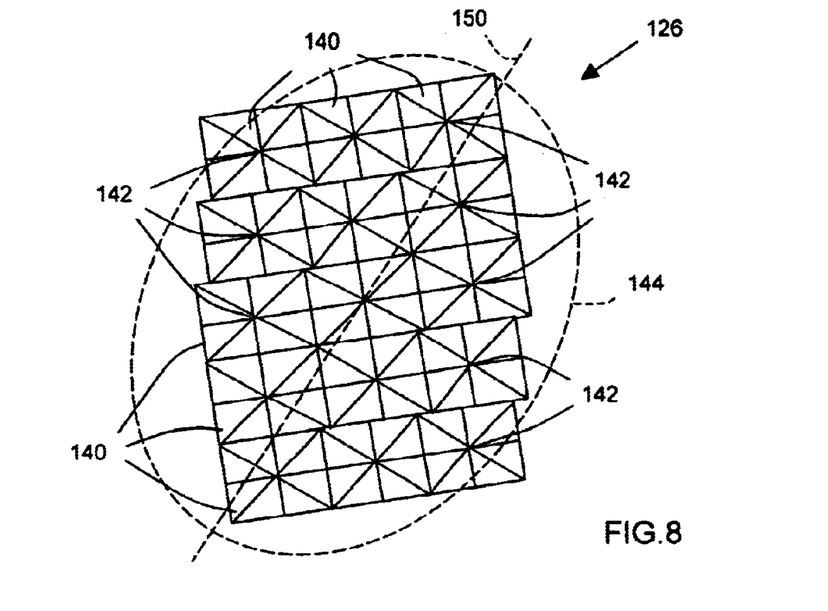
FIG. 8 is a frontal pictorial view taken along lines 8—8 of FIG. 6 showing a lenslet array layout of a second anamorphic flyseye lens of this invention.

FIGS. 6, 7, and 8 show a second, more preferred, embodiment of this invention that solves the above-described problem in a multimedia projector 120 that is architecturally similar to multimedia projector 90 of FIG. 4. However, multimedia projector 120 replaces display device 76 with MDD 50 (FIG. 5), which includes an array of micromirrors that each pivot parallel to diagonal hinge axis 110 to control pixels in on- and off-states. Display controller 56 (FIG. 1) controls the states of the array of micromirrors (pixels) to selectively reflect a projected image through a projection lens (not shown).

Multimedia projector 120 preferably includes conventional light source 32 for propagating intense illumination through a color modulator, such as color wheel 42. However, instead of entering an anamorphic integrator tunnel, light rays 96 exiting color wheel 42 propagate through an anamorphic optical system 121 comprising a conventional collimating lens system 122, a first flyseye lenslet array 124, a second flyseye lenslet array 126, and a conventional imaging lens system 128.

FIG. 7 shows first flyseye lenslet array 124, which includes a 3-by-5 array of first lenslets 130 each having the same aspect ratio as MDD 50. Preferable the shapes of first lenslets 130 are altered slightly to a rhomboid shape to compensate for the oblique illumination angle on MDD 50. First lenslets 130 are radially symmetric (spherical or aspherical) and have centers of curvature 132 that are selectively offset to steer light rays 96 toward corresponding lenslets in second flyseye lenslet array 126.

FIG. 8 shows that second flyseye lenslet array 126 includes a 3-by-5 array of second lenslets 140. Second lenslets 140 are radially symmetric (spherical or aspherical) and have centers of curvature 142 that are centered in each lenslet for best light transmission efficiency. The projection along the optical axis of centers of curvature 132 of first lenslets 130 corresponds to centers of curvature 142 of the of second lenslets 140.

First flyseye lenslet array 124 and second flyseye lenslet array 126 are tilted about the optical axis to form an anamorphic illumination ellipse 144 having a major axis 150 that is aligned with diagonal hinge axis 110 of MDD 50. Imaging lens system 128 images second flyseye lenslet array 126 on MDD50, thereby producing anamorphic incident light bundle 112 as shown in FIG. 5.

Skilled workers will recognize that portions of this invention may be implemented differently from the implementations described above for preferred embodiments. For example, anamorphic optical system 121 can be built such that the optical functions of collimating lens system 122 are built into first flyseye lenslet array 124, and/or the optical functions of imaging lens system 128 are built into second flyseye lenslet array 126. Also, each of second lenslets 140 may be designed to optically overlap all the images of first lenslets 130. Refractive optical elements are shown, but reflective optical elements may be used in some applications. Single path, frame sequential color projector embodiments are shown, but the invention is also adaptable to monochrome and multi-path color projection embodiments. Light ray angles, micromirror hinge orientations, and f/#s may differ from those described and shown and need not necessarily match. 2× anamorphic stretching is described and shown, but other stretching factors are also usable. Of course, the invention is adaptable to mirror hinge orientations, display aspect ratios, and display aspect orientations other than those described and shown.

It will be obvious to those having skill in the art that many changes may be made to the details of the above-described embodiments of this invention without departing from the underlying principles thereof. Accordingly, it will be appreciated that this invention is also applicable to optical light path applications other than those found in MDD-based multimedia projectors. The scope of this invention should, therefore, be determined only by the following claims.

I claim:

1. In a multimedia projector in which a microelectromechanical display device ("MDD") includes an array of micromirrors that each pivot on a hinge axis to effect pixel on- and off-states whereby the MDD provides a projected image by receiving an incident illumination bundle and for pixels in the on-state reflects a reflected image bundle through a projection lens, an apparatus for increasing a brightness of the projected image comprising:

an illumination source propagating light rays along an optical axis;

an anamorphic optical device receiving the light rays and forming an anamorphic incident illumination bundle that illuminates the MDD at a first f/number perpendicular to a first of the hinge axes and at a substantially faster second f/number parallel to the first hinge axis.

2. The apparatus of claim 1 in which the illumination source further includes an arc lamp and a reflector.

3. The apparatus of claim 1 in which the first f/number is about twice the second f/number.

4. The apparatus of claim 1 in which the first hinge axis is parallel to an edge margin of the MDD and the anamorphic optical device includes an anamorphic light tunnel having orthogonal height, width, and length dimensions, an input aperture with a first height and a first width for receiving the light rays, and an output aperture having a second height and a second width for forming the anamorphic incident illumination bundle.

5. The apparatus of claim 4 in which the first height and the second height are substantially the same, and the first width is about twice the second width.

6. The apparatus of claim 4 in which the MDD and the output aperture each have substantially the same width-to-height ratio.

7. The apparatus of claim 1 in which the anamorphic optical device includes a collimating lens system, first and second flyseye lenslet arrays, and an imaging lens system.

8. The apparatus of claim 7 in which the MDD has a MDD aspect ratio and the first flyseye lenslet array includes an array of first lenslets each having a lenslet aspect ratio that substantially matches the MDD aspect ratio.

9. The apparatus of claim 8 in which the anamorphic incident illumination bundle illuminates the MDD at an oblique angle and the first lenslets have a rhomboid shape that compensates for the oblique angle.

10. The apparatus of claim 7 in which the first and second flyseye lenslet arrays include arrays of respective first and second lenslets, the first lenslets each having a center of curvature that is offset to steer the light rays toward corresponding ones of the second lenslets.

11. The apparatus of claim 7 in which the second lenslets have centers of curvature that are centered in each lenslet for optimal light transmission efficiency.

12. The apparatus of claim 7 in which the first and second flyseye lenslet arrays are tilted about the optical axis such that the anamorphic incident illumination bundle has an elliptical cross section having a major axis that is substantially aligned with the first hinge axis.

13. The apparatus of claim 7 in which the imaging lens system images the first flyseye lenslet array onto the MDD, thereby producing the anamorphic incident light bundle.

14. In a multimedia projector, a method of operation comprising:
   generating light rays from an illumination source of the multimedia projector;
   receiving and shaping the generated light rays by an anamorphic optical device of the multimedia projector to form an anamorphic incident illumination bundle with a substantially elliptical cross section to illuminate a micro-electromechanical display device (MDD), the MDD having a plurality of micromirrors, each micromirror having a hinge axis, the substantially elliptical cross section of incident illumination bundle having a first axis perpendicular to a first of the hinge axes, and a second axis parallel to the first hinge axis, the second axis being longer than the first axis.

15. The method of claim 14, in which the anamorphic incident illumination bundle illuminates the MDD at a first f/number perpendicular to the first hinge axis and at a substantially faster second f/number parallel to the first hinge axis.

16. The method of claim 15, in which the first f/number is about twice the second f/number.

17. The method of claim 14, in which generating light rays from an illumination source further includes generating light rays from an arc lamp and reflecting light rays with a reflector positioned substantially adjacent to arc lamp.

18. The method of claim 14, in which the anamorphic optical device includes an anamorphic light tunnel having orthogonal height, width and length dimensions, an input aperture with a first height and a first width to receive the light rays, and an output aperture having a second height and a second width to form the anamorphic incident illumination bundle.

19. In a multimedia projector, an apparatus comprising:
   an illumination source generating light rays along an optical axis;
   an anamorphic optical device receiving the light rays and shaping an anamorphic incident illumination bundle with a substantially elliptical cross section to illuminate a micro-electromechanical display device (MDD), the MDD having a plurality of micromirrors, each micromirror having a hinge axis, the substantially elliptical cross section of incident illumination bundle having a first axis perpendicular to a first of the hinge axes, and a second axis parallel to the first hinge axis, the second axis being longer than the first axis.

20. The apparatus of claim 19, in which the anamorphic optical device includes an anamorphic light tunnel having orthogonal height, width, and length dimensions, an input aperture with a first height and a first width for receiving the light rays, and an output aperture having a second height and a second width for forming the anamorphic incident illumination bundle.

* * * * *

UNITED STATES PATENT AND TRADEMARK OFFICE
CERTIFICATE OF CORRECTION

| | |
|---|---|
| PATENT NO. | : 6,719,429 B1 |
| APPLICATION NO. | : 09/823389 |
| DATED | : April 13, 2004 |
| INVENTOR(S) | : Peterson, Mark |

Page 1 of 1

It is certified that error appears in the above-identified patent and that said Letters Patent is hereby corrected as shown below:

In the Claims:

Col. 1, line 32, "…("MDD ")…" should read --…("MDD")…--;

Col. 2, line 42, "…a MDD…" should read --…an MDD…--;

Col. 3, line 28, "…of the of the lenslets…" should read --…of the lenslets…--;

Col. 3, lines 59-60, "…a MDD-based…" should read --…an MDD-based…--;

Col. 3, line 65, "…a MDD-based…" should read --…an MDD-based…--;

Col. 5, line 18, "…lenses 100 forms…" should read --…lenses 100 form…--;

Col. 6, lines 13-14, "…142 of the of second…" should read --…142 of the second…--;

Col. 6, line 21, "…on MDD50…" should read --…on MDD 50,…--;

Col. 7, line 22, "…a MDD…" should read --…an MDD…--.

Signed and Sealed this

Twenty-ninth Day of August, 2006

JON W. DUDAS
*Director of the United States Patent and Trademark Office*